(12) United States Patent
Sugaya

(10) Patent No.: US 9,674,485 B1
(45) Date of Patent: Jun. 6, 2017

(54) SYSTEM AND METHOD FOR IMAGE PROCESSING

(71) Applicant: OPTiM Corporation, Saga (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/065,988

(22) Filed: Mar. 10, 2016

(30) Foreign Application Priority Data

Dec. 23, 2015 (JP) .................................. 2015-250757

(51) Int. Cl.
| | |
|---|---|
| H04N 7/14 | (2006.01) |
| H04N 7/15 | (2006.01) |
| H04N 5/232 | (2006.01) |
| G06K 9/00 | (2006.01) |
| G06T 11/00 | (2006.01) |
| G09B 19/00 | (2006.01) |
| G09B 5/02 | (2006.01) |

(52) U.S. Cl.
CPC ........... *H04N 7/15* (2013.01); *G06K 9/00248* (2013.01); *G06K 9/00255* (2013.01); *G06T 11/00* (2013.01); *G09B 5/02* (2013.01); *G09B 19/0076* (2013.01); *H04N 5/23219* (2013.01); *H04N 5/23222* (2013.01)

(58) Field of Classification Search
CPC ........................................................ H04N 7/14
USPC ...................... 348/14.01, 14.03, 14.02, 14.08
See application file for complete search history.

(56) References Cited

U.S. PATENT DOCUMENTS

| | | | | |
|---|---|---|---|---|
| 9,419,923 B2* | 8/2016 | Seo | ......................... | H04L 51/04 |
| 2010/0008550 A1* | 1/2010 | Dinerstein | ........... | G06K 9/6253 382/118 |
| 2010/0226531 A1* | 9/2010 | Goto | .................... | A45D 44/005 382/103 |
| 2012/0309520 A1* | 12/2012 | Evertt | .................... | G06T 19/20 463/31 |
| 2014/0016823 A1* | 1/2014 | Ye | .......................... | G06T 19/20 382/103 |
| 2014/0056491 A1* | 2/2014 | Knight | ............... | G06K 9/00221 382/118 |

(Continued)

FOREIGN PATENT DOCUMENTS

| | | |
|---|---|---|
| JP | 2013-223001 | 10/2013 |
| JP | 2015-197710 | 11/2015 |

OTHER PUBLICATIONS

Remote Experience Sharing for Cosmetics(Video), Youtube, published on Oct. 15, 2015, https://www.youtube.com/watch?v=JsJCY-96e3w&feature=youtu.be.

(Continued)

*Primary Examiner* — Olisa Anwah
(74) *Attorney, Agent, or Firm* — Lex IP Meister, PLLC

(57) ABSTRACT

The present invention is to provide a system for image processing that are capable of analogizing a composition part of an object at a low price but high performance by using the guide display unit. The user terminal 100 includes an imaging module 111 that takes an image of an object, a guide display module 132 that displays a guide to image a composition part composing the object, and an analogy module 141 that analogizes the composition part. Screen sharing between the user terminal 100 and the adviser terminal 200 enables the makeup adviser to offer the user an advice in real time.

12 Claims, 19 Drawing Sheets

(56) References Cited

U.S. PATENT DOCUMENTS

| | | | | |
|---|---|---|---|---|
| 2014/0146190 | A1* | 5/2014 | Mohammadi | A61M 35/00 |
| | | | | 348/207.2 |
| 2014/0368629 | A1* | 12/2014 | Lucet-Levannier | A45D 44/005 |
| | | | | 348/77 |
| 2015/0050624 | A1* | 2/2015 | Yamanashi | A45D 44/00 |
| | | | | 434/100 |
| 2015/0058129 | A1* | 2/2015 | Nevid | G06Q 30/0267 |
| | | | | 705/14.64 |
| 2015/0086945 | A1* | 3/2015 | Yamanashi | A45D 44/005 |
| | | | | 434/100 |
| 2015/0254501 | A1* | 9/2015 | Yamanashi | G06K 9/00268 |
| | | | | 348/78 |
| 2015/0297471 | A1* | 10/2015 | Sunkel | A61K 8/0216 |
| | | | | 424/401 |
| 2015/0356661 | A1* | 12/2015 | Rousay | G06Q 30/0631 |
| | | | | 705/26.7 |
| 2015/0366328 | A1* | 12/2015 | Tamura | A45D 44/00 |
| | | | | 434/100 |

OTHER PUBLICATIONS

Pamphlet, "Remote Support for Makeup Application", Optim Corporation, Oct. 15, 2015.

* cited by examiner

SYSTEM AND METHOD FOR IMAGE PROCESSING

CROSS REFERENCE TO RELATED APPLICATIONS

This application claims priority to Japanese Patent Application No. 2015-250757 filed on Dec. 23, 2015, the entire contents of which are incorporated by reference herein.

TECHNICAL FIELD

The present invention relates to a system and a method for image processing to analogize parts composing the face of an object.

BACKGROUND ART

Various technologies that support the users' makeup are proposed conventionally. For example, Patent Document 1 describes the display technology to enable users to put on makeup and adjust their clothes while checking their image on a display. Moreover, Patent Document 2 describes the technology to support users' makeup based on three-dimensional information acquired by using three-dimensional instrumentation.

CITATION LIST

Patent Literature

Patent Document 1: JP 2013-223001A
Patent Document 2: JP 2015-197710A

SUMMARY OF INVENTION

However, the method of Patent Document 1 may not superpose a taken image on an image to be compared well according to the performance of the recognition tool that recognizes a specific portion.

The method of Patent Document 2 may easily recognize a face compared with Patent Document 1 thank to three-dimensional information but has a problem because an expensive device is required to project a pattern for measurement from a projector.

Both Patent Documents 1 and 2 enable users to only check their makeup from an image by themselves. However, users may desire to receive advices on detailed procedures and how to handling cosmetics on hand from a specialist when they want to put on makeup in a different way from usual or to learn new makeup.

In view of the above-mentioned problems, an objective of the present invention is to provide a system and a method for image processing to analogize parts composing the face of an object.

The first aspect of the present invention provides a system for image processing, including;
an imaging unit that images an object;
a guide display unit that displays a guide to image a composition part composing the object; and
an analogy unit that analogizes the composition part from the image of the object.

According to the first aspect of the present invention, a system for image processing includes; an imaging unit that images an object; a guide display unit that displays a guide to image a composition part composing the object; and an analogy unit that analogizes the composition part from the image of the object.

The first aspect of the present invention is the category of a system for image processing, but the category of a method for image processing has similar functions and effects.

The second aspect of the present invention provides the system according to the first aspect of the present invention, in which the guide display unit indicates any one of a size, a direction, or a position of the object when the object is a person's face.

According to the second aspect of the present invention, in the system according to the first aspect of the present invention, the guide display unit indicates any one of a size, a direction, or a position of the object when the object is a person's face.

The third aspect of the present invention provides the system according to the first aspect of the present invention, in which the analogy unit analogizes a type of the composition part by image recognition of the image of the object and adds text information to the analogized composition part.

According to the third aspect of the present invention, in the system according to the first aspect of the present invention, the analogy unit analogizes a type of the composition part by image recognition of the image of the object and adds text information to the analogized composition part.

The fourth aspect of the present invention provides the system according to the first aspect of the present invention, in which the analogy unit displays that an object is successfully imaged when analogizing one or more composition parts.

According to the fourth aspect of the present invention, in the system according to the first aspect of the present invention, the analogy unit displays that an object is successfully imaged when analogizing one or more composition parts.

The fifth aspect of the present invention provides the system according to the first aspect of the present invention further including a makeup reference image display unit that displays a makeup reference image of the each analogized composition part.

According to the fifth aspect of the present invention, the system according to the first aspect of the present invention further includes a makeup reference image display unit that displays a makeup reference image of the each analogized composition part.

The sixth aspect of the present invention provides the system according to the fifth aspect of the present invention further including a makeup reference image application unit that selects an image from the makeup reference image and applies the selected image to the image of the object.

According to the sixth aspect of the present invention, the system according to the fifth aspect of the present invention further includes a makeup reference image application unit that selects an image from the makeup reference image and applies the selected image to the image of the object.

The seventh aspect of the present invention provides the system according to the sixth aspect of the present invention further including an advice unit that offers the object advice about how to put on makeup of the selected makeup reference image.

According to the seventh aspect of the present invention, the system according to the sixth aspect of the present invention further includes an advice unit that offers the object advice about how to put on makeup of the selected makeup reference image.

The eighth aspect of the present invention provides the system according to the seventh aspect of the present invention, in which the advice unit offers advice in real time through screen sharing between the object and a makeup adviser.

According to the eighth aspect of the present invention, in the system according to the seventh aspect of the present invention, the advice unit offers advice in real time through screen sharing between the object and a makeup adviser.

The ninth aspect of the present invention provides a method for image processing, including the steps of;

imaging an object;

displaying a guide to image a composition part composing the object; and analogizing the composition part from the image of the object.

The present invention can provide a system and a method for image processing to analogize parts composing the face of an object.

DESCRIPTION OF EMBODIMENTS

Embodiments of the present invention will be described below with reference to the attached drawings. However, this is illustrative only, and the technological scope of the present invention is not limited thereto.

Overview of System for Image Processing

Figure 1:
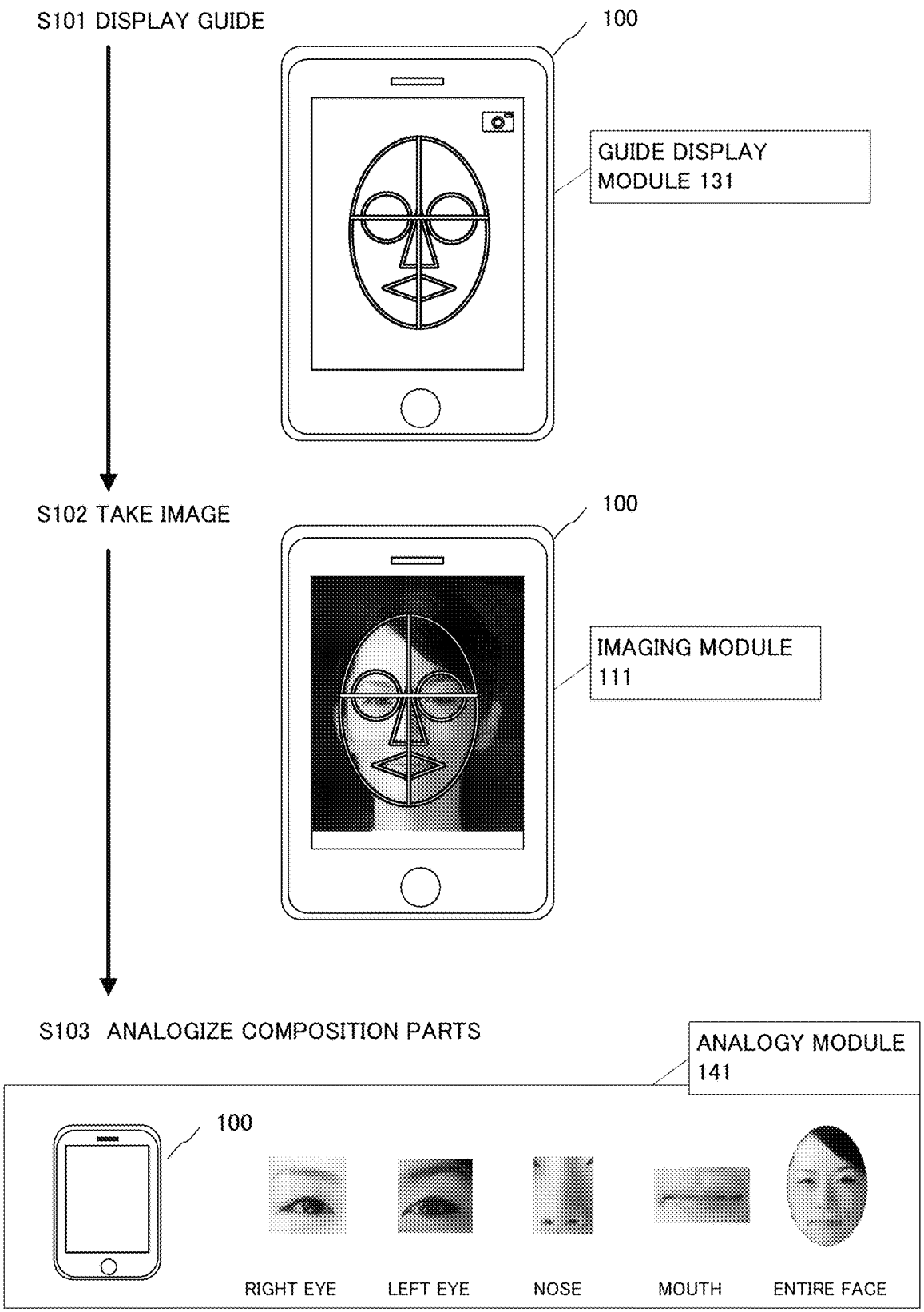
FIG. 1 shows a schematic diagram of a preferable embodiment of the present invention.
Figure 2:
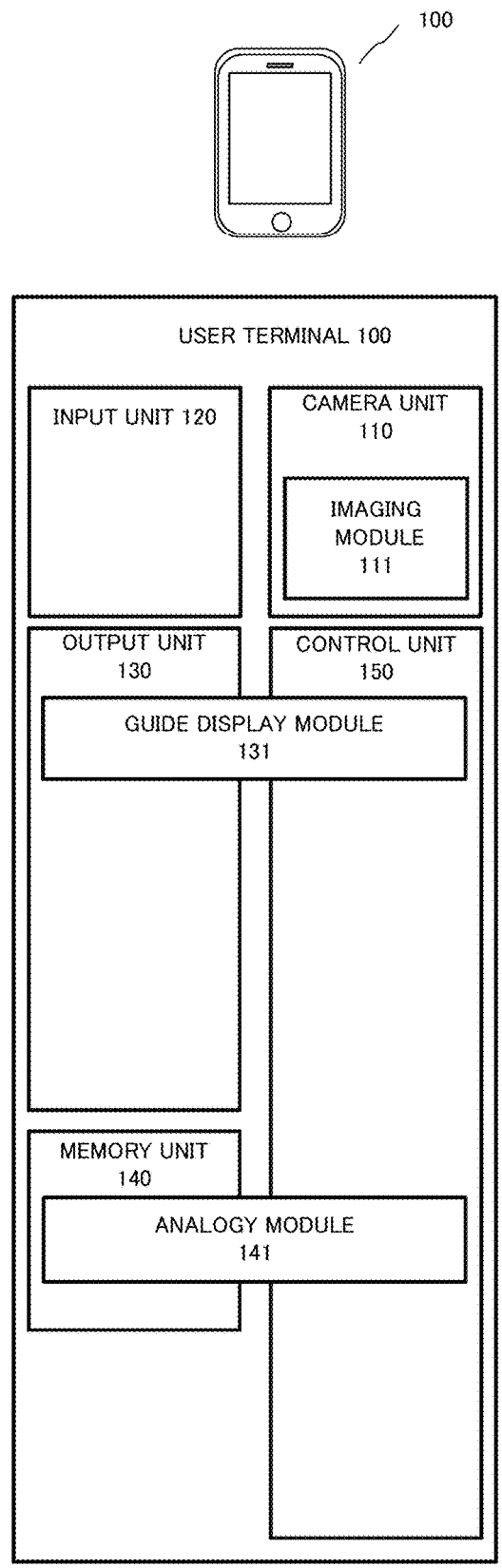
FIG. 2 shows a functional block diagram of the user terminal 100 to show the relationship among the functions.

The overview of the present invention will be described below with reference to FIG. 1. The user terminal 100 includes a camera unit 110, an input unit 120, an output unit 130, a memory unit 140, and a control unit 150 as shown in FIG. 2. The camera unit 110 includes an imaging module 111. The output unit 130 achieves a guide display module 131 in cooperation with the control unit 150. The memory unit 140 achieves an analogy module 141 in cooperation with the control unit 150.

Figure 3:
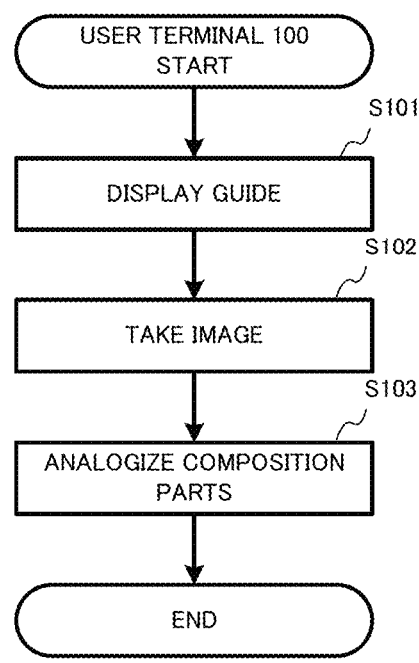
FIG. 3 shows a flow chart of the composition part analogy process performed by the user terminal 100.

FIG. 3 shows a flow chart of the composition part analogy process performed by the user terminal 100. The process shown in FIG. 1 is performed based on this flow chart, which will also be explained below.

In the composition part analogy process, the user terminal 100 first displays a guide by using the guide display module 131 to support a user to take an image (step S101).

Figure 12:
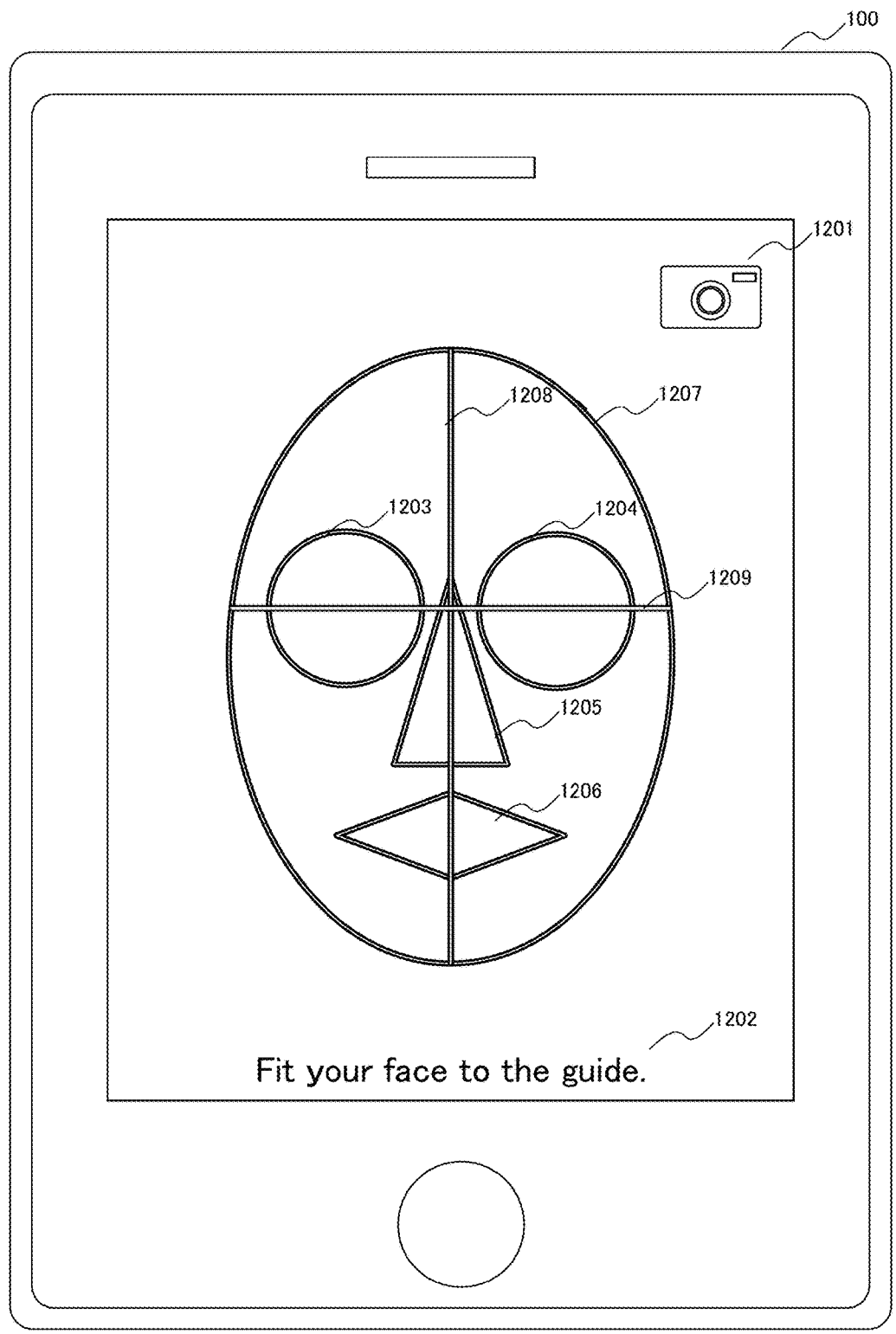
FIG. 12 shows one example of the guide display function of the user terminal 100.

FIG. 12 shows one example of the guide display function of the user terminal 100. The message 1202 asks a user to fit the face parts to the guide lines displayed on the screen to take a facial image of an object. An example of the guide lines shown in FIG. 12 includes a right eye 1203, a left eye 1204, a nose 1205, a mouth 1206, a facial contour 1207, a vertical line 1208 passing through the center of the face, and a horizontal line 1209 passing through the center of the eyes. These guide lines are useful for a user to image the face in an appropriate size, direction, and position and effective to detect a composition part with a high probability in a short time by searching parts near the guide lines in the following composition part analogy process. In this embodiment, the guide lines are simply displayed in straight lines and ovals but may be in free curves and adjustable curves. Moreover, the eyes and the eyebrows may be separately displayed. The guide lines may also be displayed in an outline of each composition part that is obtained by averaging data extracted from a large amount of facial image data. FIG. 12 shows a guide to take a frontal face image. However, another guide may be prepared to take a lateral or an oblique face image.

Then, the imaging module 111 takes an image of an object (step S102). In this embodiment, the imaging is started by selecting the camera mark 1201 shown in FIG. 12, for example. The image may be taken by oneself with the in-camera of a smart phone or a tablet or by other people with a camera (out camera) on the back side. Alternatively, the image in a mirror may be taken by oneself. An image to be taken is superposed on the guide as shown in FIG. 1 so as to take the image in an appropriate size, direction, and position.

Finally, the analogy module 141 analogizes the composition parts from the taken image of the object (step S103). As an image of an object, a still or moving image may be taken. When a moving image is taken, a still image only has to be captured from the moving image at regular time intervals to analogize the composition parts from the still image. The composition parts herein compose the face, such as a right eye, a left eye, a nose, a mouth, and the entire face. The types and the number of the composition parts may be appropriately set depending on systems. For example, eyes may be separated from eyebrows.

The composition part analogy process may be performed by general image recognition such as pattern matching. Since the image is taken by using the guide, the composition part analogy process can be efficiently performed by searching composition parts near the guide lines. Moreover, the names of the composition parts such as a nose and a mouth analogized by image recognition are associated and stored with image data as text information.

Functions

FIG. 2 shows a functional block diagram of the user terminal 100 to show the relationship among the functions. The user terminal 100 includes a camera unit 110, an input unit 120, an output unit 130, a memory unit 140, and a control unit 150. The camera unit 110 includes an imaging module 111. The output unit 130 achieves the guide display module 131 in cooperation with the control unit 150. The memory unit 140 achieves the analogy module 141 in cooperation with the control unit 150.

The user terminal 100 may be a general information terminal with which a user can take an image by using the camera, which is an information device or an electrical appliance with functions to be described later. For example, the user terminal 100 may be a general information appliance such as a mobile phone, a smart phone, a tablet PC, a notebook, a wearable device, or an electronic appliance, which has a camera function or connectivity with an external camera such as a web camera. The smart phone shown as the user terminal 100 in the attached drawings is just one example.

The user terminal 100 includes a camera in the camera unit 110 to achieve the imaging module 111. The imaging module 111 converts a taken image into digital data to store in the memory unit 140. The image may be a still image or a moving image. If the image is a moving image, the control unit 150 can capture a part of the moving image to store in the memory unit 140 as a still image. The obtained taken image is an accurate image with information as much as the user needs. The pixel count and the image quality can be specified.

The input unit 120 has a function necessary to instruct to display the above-mentioned guide and take an image. The input unit 110 may include a liquid crystal display to achieve a touch panel function, a key board, a mouse, a pen tablet, and a hardware button on the device, and a microphone to perform voice recognition. The features of the present invention are not limited in particular by an input method.

The output unit 130 achieves the guide display module 131 in cooperation with the control unit 150. The output unit 130 has a function necessary to display the guide and an image to be taken. The output unit 130 may take forms such as a liquid crystal display, a PC display, and a projector. The features of the present invention are not limited in particular by an output method.

The memory unit 140 includes a data storage unit such as a hard disk or a semiconductor memory to store taken moving and still images, data necessary for the analogy process, image data and text information on analogized composition parts, etc. The memory unit 140 achieves the analogy module 141 in cooperation with the control unit 150.

The control unit 150 includes a central processing unit (hereinafter referred to as "CPU"), a random access memory (hereinafter referred to as "RAM"), and a read only memory (hereinafter referred to as "ROM").

Analogy Result Display Process

Figure 4:
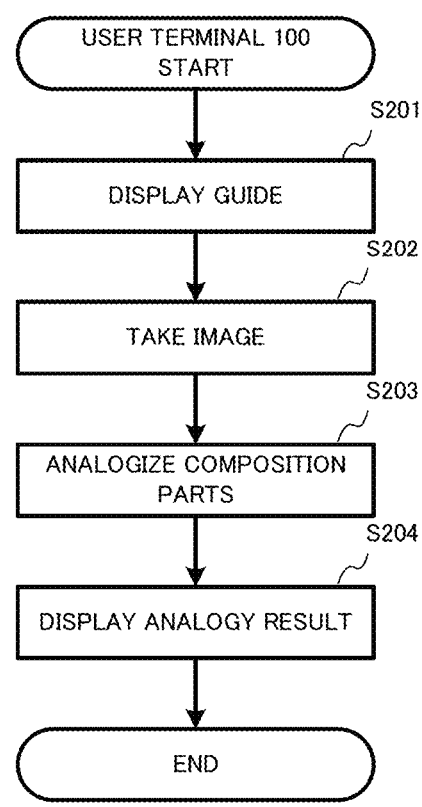
FIG. 4 shows a flow chart of the composition part analogy result display process performed by the user terminal 100.

FIG. 4 shows a flow chart of the composition part analogy result display process performed by the user terminal 100. The composition part analogy result is displayed in addition to the above-mentioned composition part analogy process. The difference from the flow chart of FIG. 3 will be explained below.

The guide display (step S201), the imaging (step S202), and the composition part analogy (step S203) of FIG. 4 are the same as the guide display (step S101), the imaging (step S102), and the composition part analogy (step S103) of FIG. 3.

If one or more composition parts are detected by the composition part analogy in the step S203, the image is recognized to be taken according to the guide to display an analogy result of the composition parts on the output unit 130 of the user terminal 100 (step S204).

Figure 13:
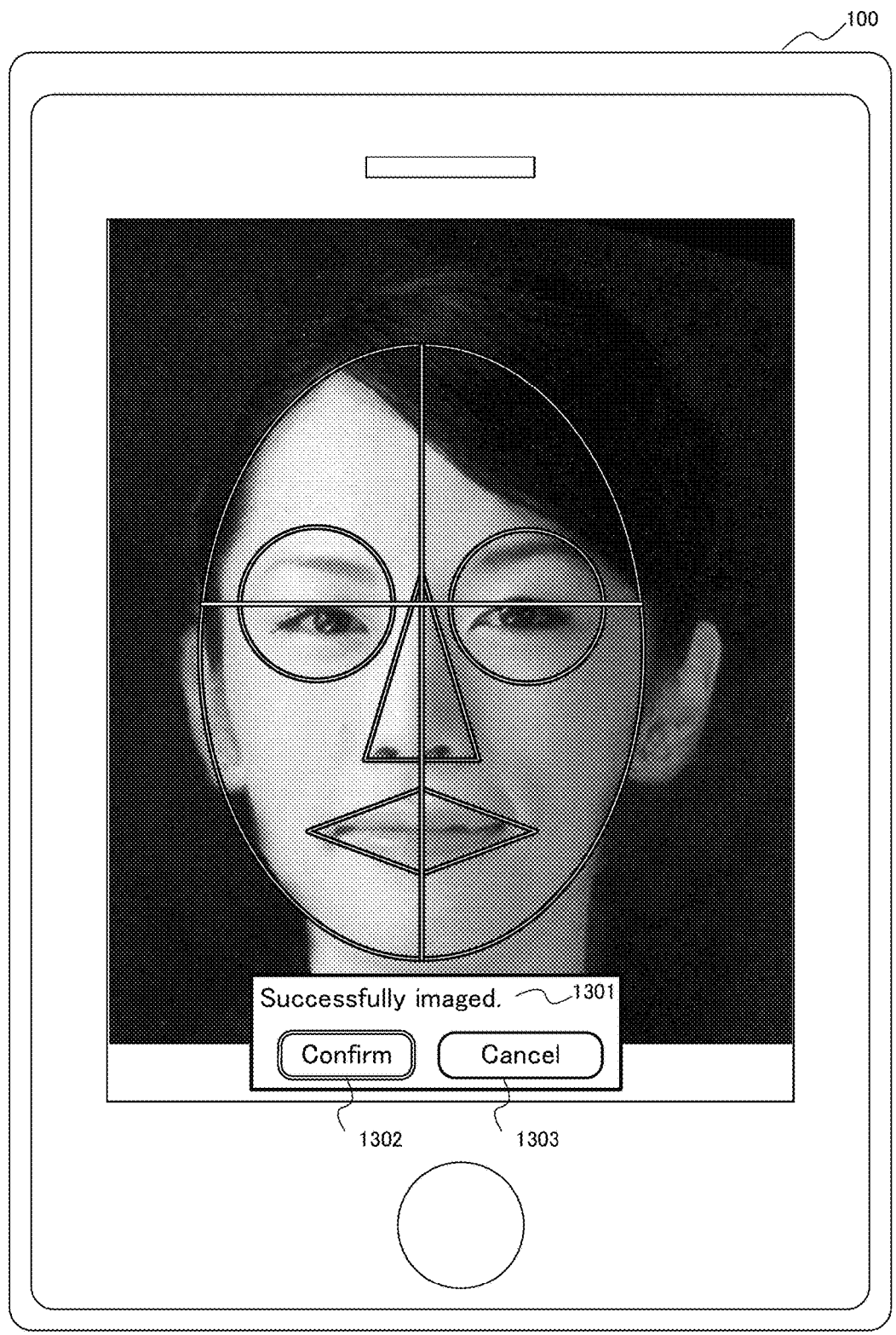
FIG. 13 shows one example display when an image is taken by using the guide display function of the user terminal 100.

FIG. 13 shows one example display when an image is taken by using the guide display function of the user terminal 100. If any or all the composition parts, a right eye, a left eye, a nose, a mouth, and the entire face are found by the composition part analogy (step S203), the image is recognized to be taken according to the guide to display the massage 1301 that the imaging has been successful. In this case, the taken image may be subjected to the following process so that a confirmation button 1302 and a cancellation button 1303 may be displayed together. If the confirmation button 1302 is selected, the currently displayed image is subjected to the following makeup reference image application process, etc. If the cancellation button 1303 is selected, an image will be taken again.

Advice Process

Figure 5:
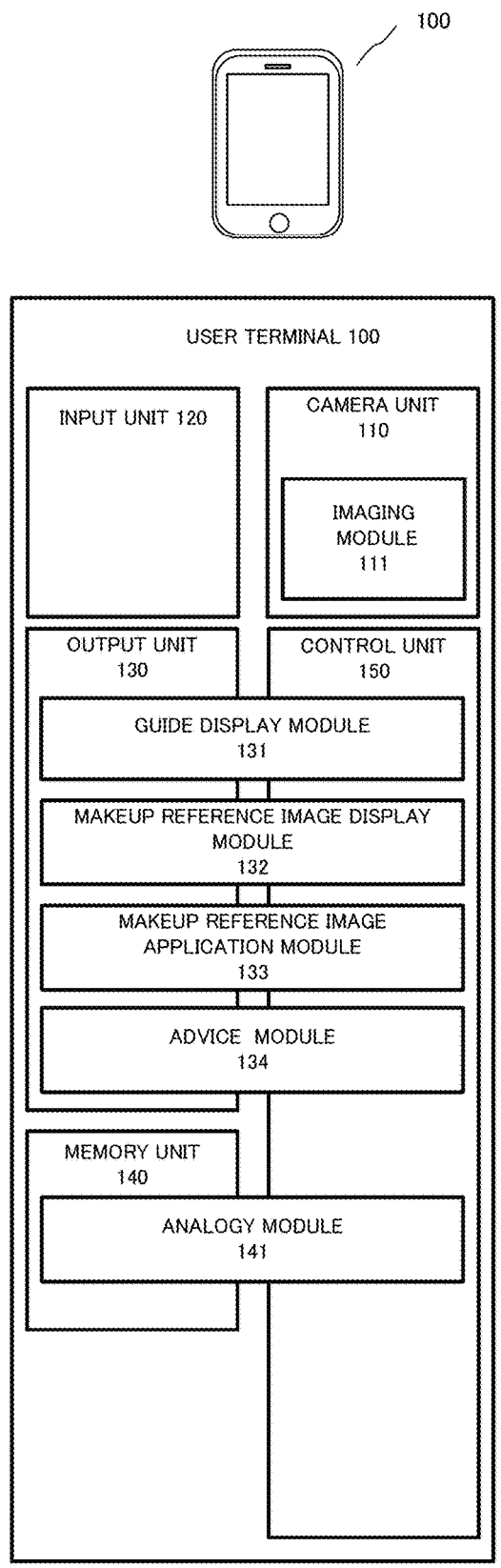
FIG. 5 shows a functional block diagram of the user terminal 100 with an advice function to show the relationship among the functions.

FIG. 5 shows a functional block diagram of the user terminal 100 with an advice function to show the relationship among the functions. In addition to the functions of FIG. 2, the output unit 130 achieves a makeup reference image display module 132, a makeup reference image application module 133, and an advice module 134 in cooperation with the control unit 150.

Figure 6:
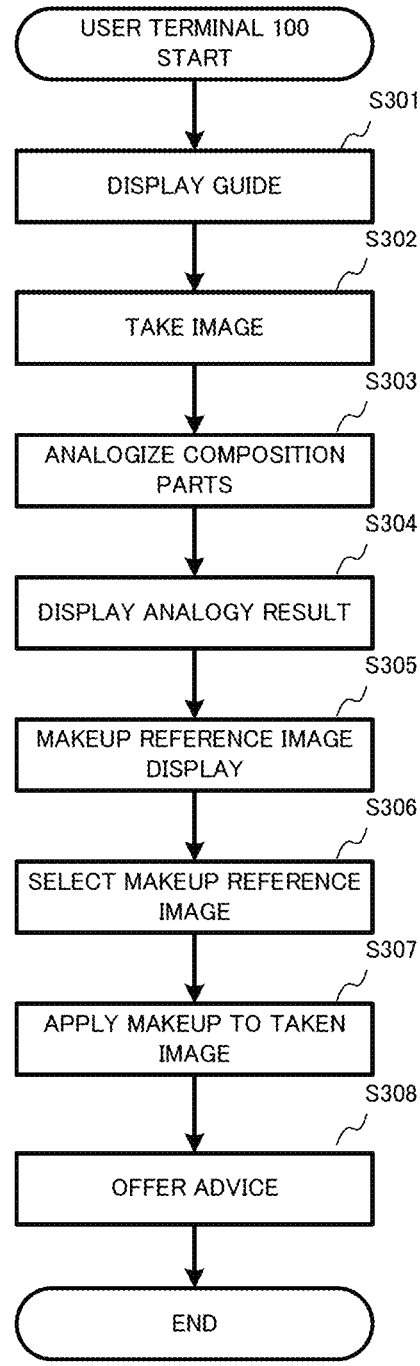
FIG. 6 shows a flow chart of the advice process performed by the user terminal 100.

FIG. 6 shows a flow chart of the advice process performed by the user terminal 100. The guide display (step S301), the imaging (step S302), the composition part analogy (step S303), and the analogy result display (step S304) of FIG. 6 are the same as the guide display (step S201), the imaging (step S202), the composition part analogy (step S203), and the analogy result display (step S204) of FIG. 4.

If the advice process is performed, the makeup reference image display module 132 displays the makeup reference image (step S305) after the analogy result is displayed in the step S304.

Figure 14:
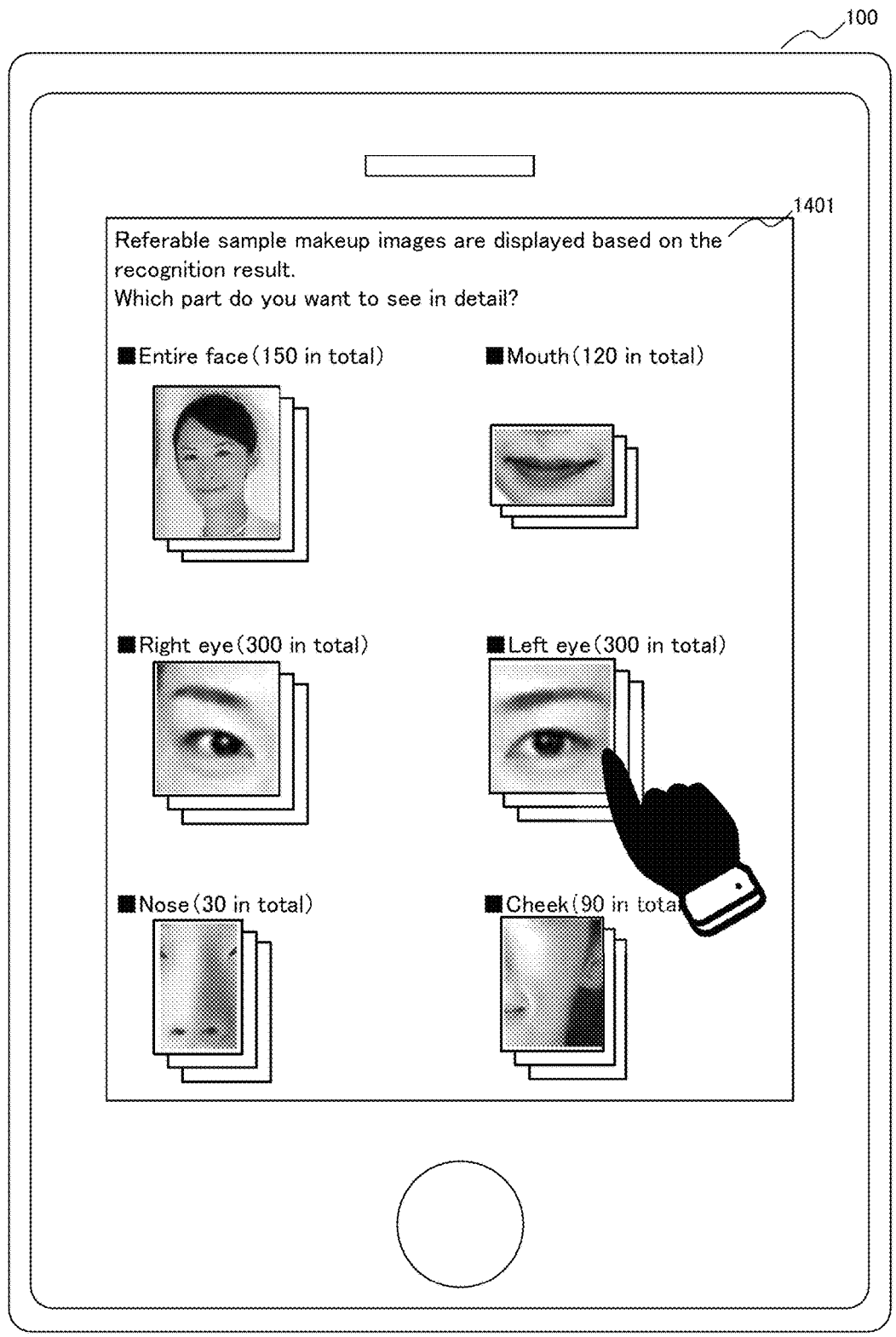
FIG. 14 shows one example of the makeup reference image displayed on the user terminal 100.

FIG. 14 shows one example of the makeup reference image displayed on the user terminal 100. A list of makeup reference images are displayed for each analogized composition part. In FIG. 14, the message 1401 is that referable sample makeup images of each composition part analogized based on the recognition result are displayed. In this embodiment, the entire face, a mouth, a right eye, a left eye, a nose, and a cheek are recognized and displayed. The number of referable sample makeup images of each composition part is displayed, and the representative sample makeup images are thumbnailed. In FIG. 14, a composition part for which the user wishes to know the detailed makeup method is selected.

Figure 15:
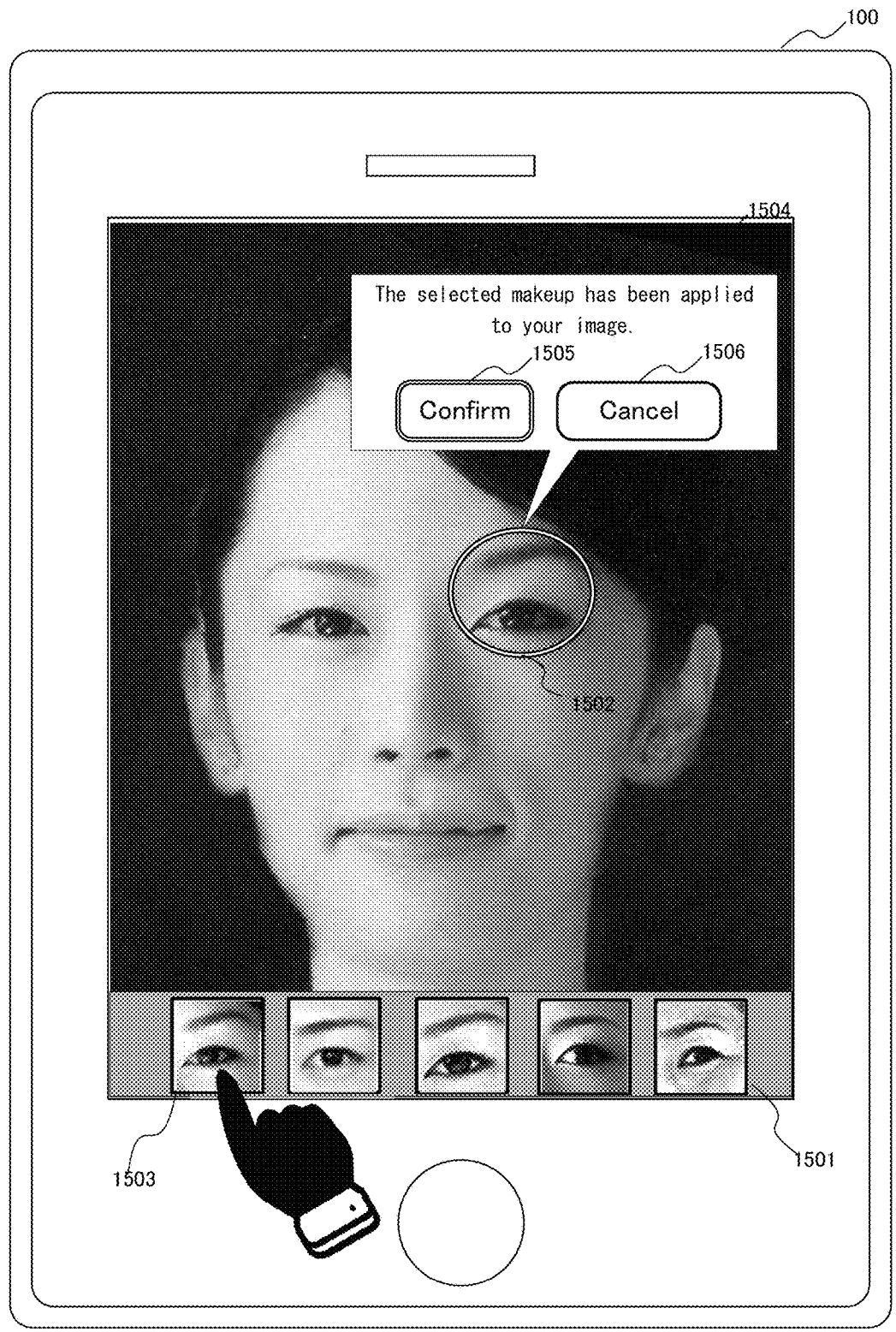
FIG. 15 shows one example display when the selected makeup reference image is applied to an image that the user terminal 100 took.

If the left eye is selected in FIG. 14, the screen as shown in FIG. 15 is displayed. FIG. 15 shows one example display when the selected makeup reference image is applied to an image that the user terminal 100 took. The area 1501 in FIG. 15 displays a list of makeup reference images of the left eye selected in FIG. 14. At this time, text information on the composition part is added to the makeup reference images help the process perform at high speed. The area 1501 displays only five makeup reference images but can display all the makeup reference images by scrolling the images right and left. In FIG. 15, the area 1501 displays only makeup reference images of the left eye but may display makeup reference images of all the composition parts depending on the system. Moreover, makeup reference images may not be displayed for each analogized composition part and may be for each makeup adviser.

Then, one of the makeup reference images displayed in the area 1501 is selected (step S306), and the makeup reference image application module 133 applies the makeup of the selected makeup reference image to the taken image (step S307). FIG. 15 shows an example case in which a selected makeup reference image 1503 is applied to the left eye area 1502. At this point, the message 1504 that the selected makeup has been applied to the taken image is displayed. If satisfied with the selected makeup reference image, the user selects the confirmation button 1505 to proceed to the following advice process. If wishing to select another makeup reference image, the user selects the cancellation button 1506 to select a makeup reference image again.

After the confirmation button 1505 is selected, the advice module 134 outputs an advice on the selected makeup reference image (step S308).

Figure 16:
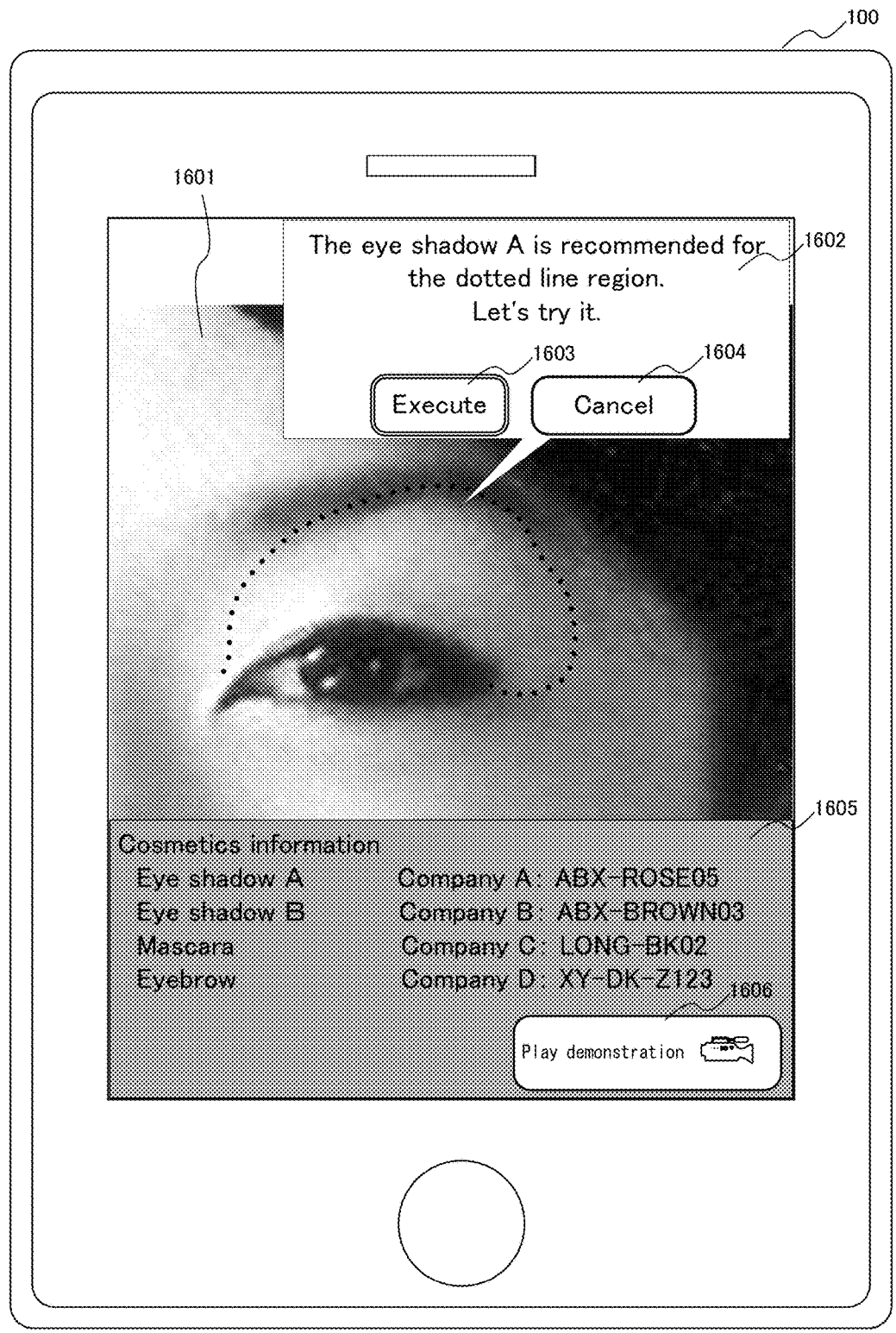
FIG. 16 shows one example advice displayed on the user terminal 100.

FIG. 16 shows one example advice displayed on the user terminal 100. The display area 1601 displays the taken image to which a makeup reference image is applied. The message 1602 is an easy explanation of the makeup method. If the execution button 1603 is selected, the makeup method is displayed in detail step by step with images and messages. If the demonstration image reproduction button 1606 is selected, the makeup method is displayed with a video image. If the cancellation button 1604 is selected, the makeup reference image display of the step S305 or the guide display of the step S301 is repeated. Moreover, the area 1605 displays information on cosmetics used based on the makeup reference image. The cosmetics information may link to an online shopping website, etc., on the Internet.

Makeup Adviser's Advice Process

Figure 7:
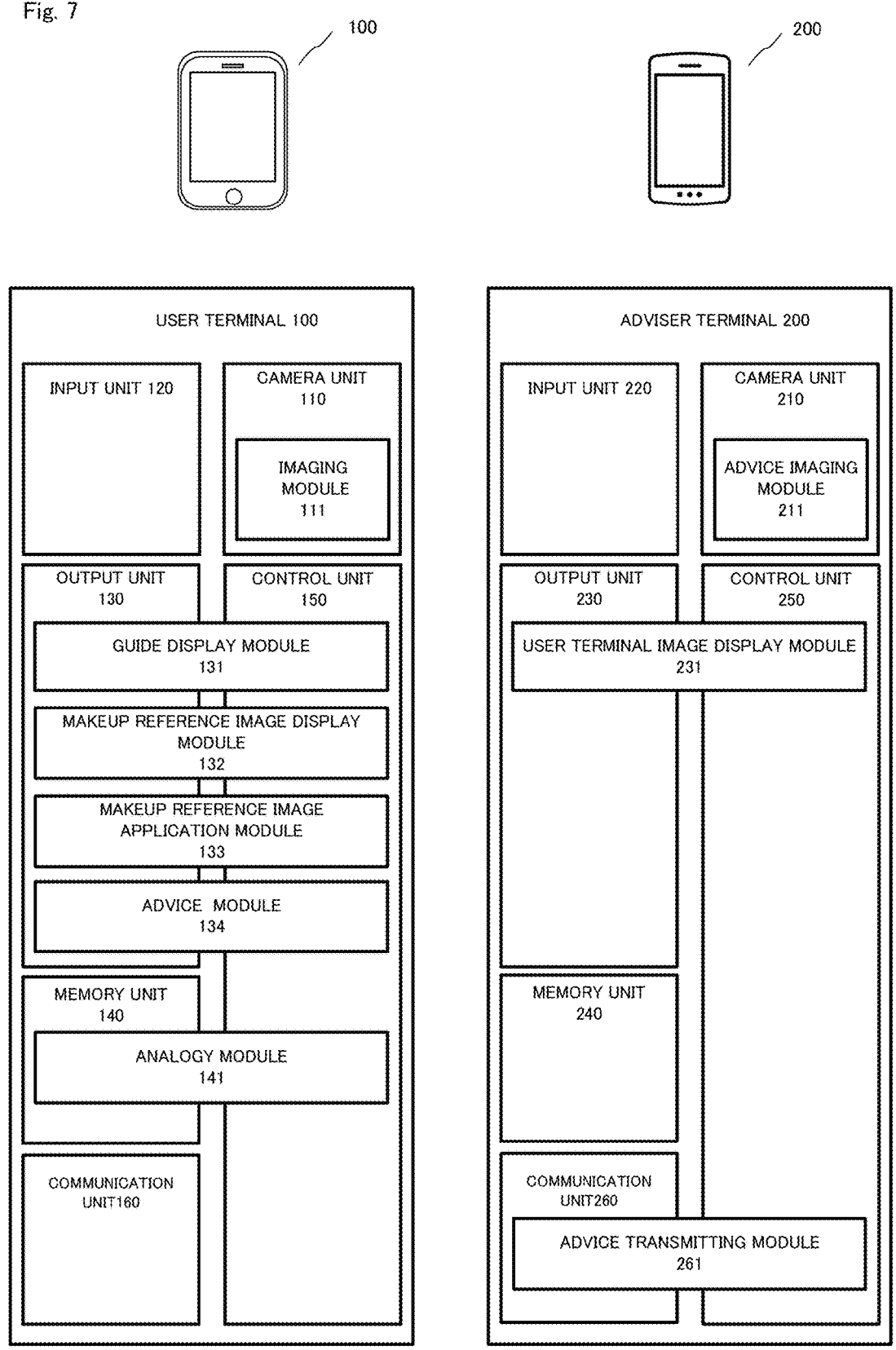
FIG. 7 shows a functional block diagram of the user terminal 100 with a makeup adviser's advice function and the adviser terminal 200 to show the relationship among the functions.

FIG. 7 shows a functional block diagram of the user terminal 100 with a makeup adviser's advice function and the adviser terminal 200 to show the relationship among the functions.

The user terminal 100 includes a communication unit 160 in addition to the above-mentioned units shown in FIG. 5. The user terminal 100 can transmit images and voices of the display on the output unit 130 through the communication unit 160. The user terminal 100 can also transmit the stored still and moving images, input character strings and voice messages, etc., through E-mail, a short message service (hereinafter referred to as "SMS"), a chat service, a social networking service (hereinafter referred to as "SNS"), etc.

The communication unit 160 includes a Wireless Fidelity (Wi-Fi®) enabled device complying with, for example, IEEE 802.11, or a wireless device complying with the IMT-2000 standard such as the third generation mobile communication system. The communication unit may include a wired device for LAN connection.

For the makeup adviser's advice process, the input unit 120 of the user terminal 100 preferably also has a microphone function, etc., to take place voice interaction with the adviser terminal 200.

The adviser terminal 200 that a makeup adviser uses includes a camera unit 210, an input unit 220, an output unit 230, a memory unit 240, a control unit 250, and a communication unit 260. The camera unit 210 includes an advice imaging module 211. The output unit 230 achieves a user terminal image display module 231 in cooperation with the control unit 250. The communication unit 260 achieves an advice transmitting module 261 in cooperation with the control unit 250.

The adviser terminal 200 may be a general information terminal with which a makeup adviser can take an image by using the camera in the same way as the user terminal 100, which is an information device or an electrical appliance with functions to be described later. For example, the adviser terminal 200 may be a general information appliance such as a mobile phone, a smart phone, a tablet PC, a notebook, a wearable device, or an electronic appliance which has a camera function or connectivity with an external camera such as a web camera. The smart phone shown as the adviser terminal 200 in attached drawings is just one example.

The adviser terminal 200 has a camera in the camera unit 210 provided with an advice imaging module 211. The advice imaging module 211 converts a taken image into digital data to store in the memory unit 240. The image may be a still image or a moving image. If the image is a moving image, the control unit 250 can capture a part of the moving image to store in the memory unit 240 as a still image. The obtained taken image is an accurate image with information as much as the system needs. The pixel count and the image quality can be specified.

The input unit 220 has an input function necessary to advise the user. The input unit 220 may include a liquid crystal display to achieve a touch panel function, a key board, a mouse, a pen tablet, and a hardware button on the device. The input unit 220 preferably also has a microphone function, etc., to take place voice interaction with the user terminal 100. The features of the present invention are not limited in particular by an input method.

The output unit 230 achieves a user terminal image display module 231 in cooperation with the control unit 250. The user terminal image display module 231 displays some or all the images being output to the output unit 130 of the user terminal 100 on the output unit 230 of the adviser terminal 200. The output unit 230 may take forms such as a liquid crystal display, a PC display, and a projector. The features of the present invention are not limited in particular by an output method.

The memory unit 240 includes a data storage unit such as a hard disk or a semiconductor memory to store necessary information such as taken moving and still images, moving or still images received from the user terminal 100, and voices.

The control unit 250 includes a CPU, a RAM, and a ROM.

The communication unit 260 includes a Wi-Fi® enabled device complying with, for example, IEEE 802.11, or a wireless device complying with the IMT-2000 standard such as the third generation mobile communication system. The communication unit may include a wired device for LAN connection. The communication unit 260 achieves the advice transmitting module 261 in cooperation with the control unit 250. The advice transmitting module 261 can transmit images and voices of the display on the output unit 230. The advice transmitting module 261 can also transmit the stored still and moving images, input character strings and voice messages, etc., through E-mail, SMS, a chat service, SNS, etc.

Figure 8:
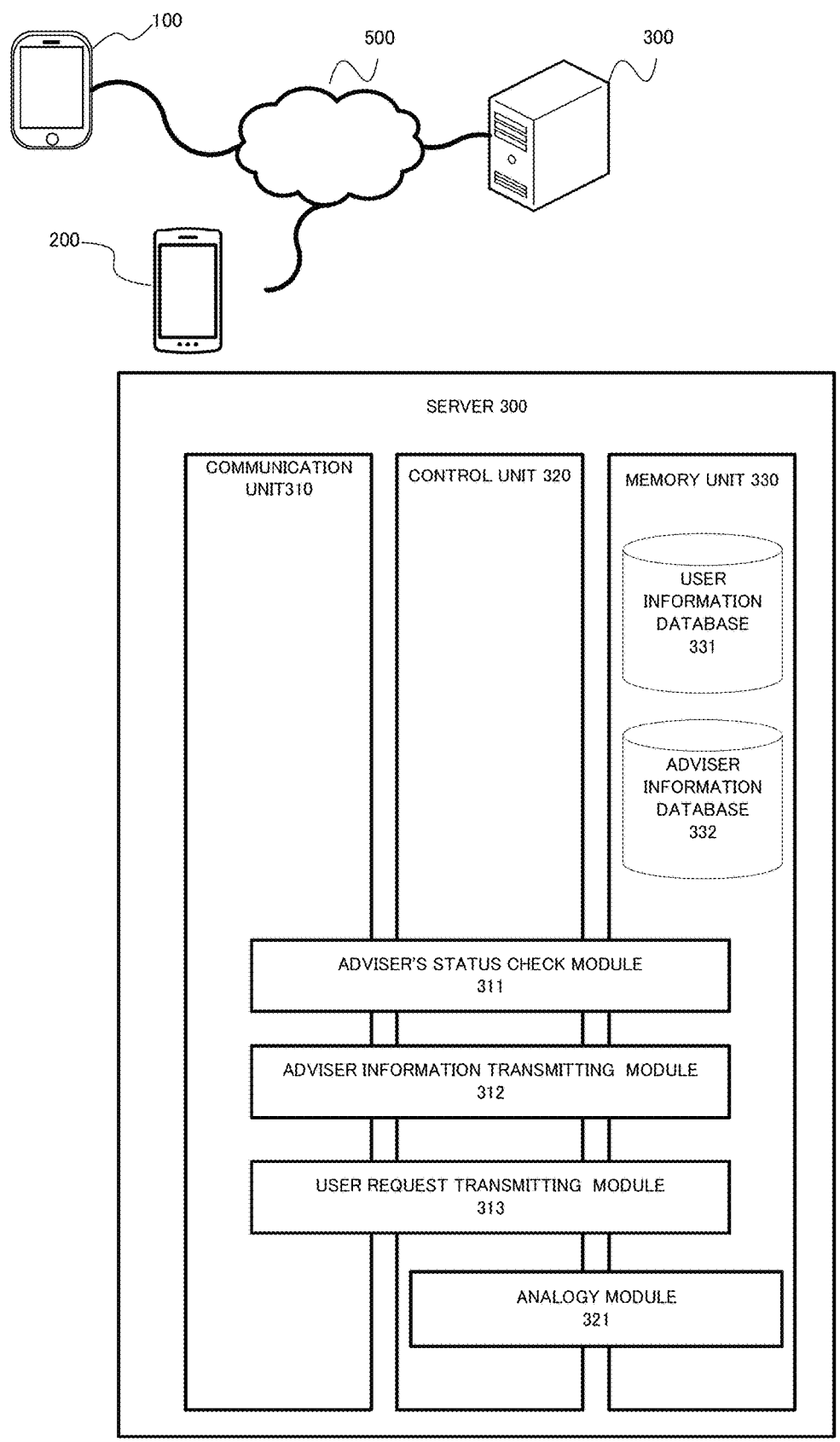
FIG. 8 shows a functional block diagram of the user terminal 100, the adviser terminal 200, and the server 300 to illustrate the relationship among the functions.

FIG. 8 shows a functional block diagram of the user terminal 100, the adviser terminal 200, and the server 300 to illustrate the relationship among the functions. The user terminal 100, the adviser terminal 200, and the server 300 are connected through a communication network 500. The communication network 500 may be a public or private line network. The user terminal 100 may be directly connected with the adviser terminal 200 through peer to peer communication as appropriate.

The server 300 may be a general server provided with the functions to be described later, which includes a communication unit 310, a control unit 320, and a memory unit 330.

The communication unit 310 includes a wired device for LAN connection, a Wi-Fi® enabled device complying with, for example, IEEE 802.11, or a wireless device complying with the IMT-2000 standard such as the third generation mobile communication system. The communication unit 310 achieves an adviser's status check module 311, an adviser information transmitting module 312, and a user request transmitting module 313 in cooperation with the control unit 320 and the memory unit 330.

The control unit 320 includes a CPU, a RAM, and a ROM. The control unit 320 may include an analogy module 321 in cooperation with the memory unit 330. The analogy module 321 analogizes a composition part in the same way as the analogy module 141 of the user terminal 100. To perform the analogy process in the server 300, the image of an object that the user terminal 100 took is transmitted to the server 300 through the communication unit 160 of the user terminal 100. The server 300 receives an image from the communication unit 310, stores the received image in the memory unit 330, and performs the composition part analogy process for the image. The result of the composition part analogy process is transmitted to the user terminal 100 through the communication unit 310. The analogy result is displayed on the output unit 130 of the user terminal 100. Advantages of performing the composition part analogy process in the server 300 are that a large amount of data necessary for pattern matching can be accumulated in the memory unit 330 and that the latest process can be applied by updating only the analogy module 321 of the server 300 when the composition part analogy process is updated.

The memory unit 330 includes a data storage unit such as a hard disk or a semiconductor memory. The memory unit 330 has a user information data base 331 and an adviser information data base 332 to store necessary information for the system.

Figure 9:
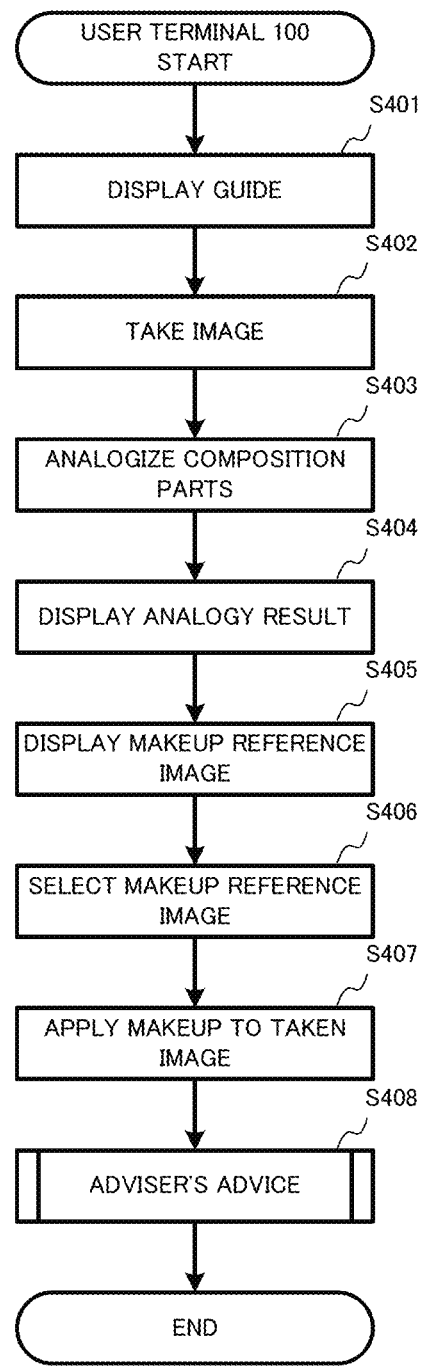
FIG. 9 shows a flow chart of the makeup adviser's advice process.

FIG. 9 shows a flow chart of the makeup adviser's advice process. The guide display (step S401), the imaging (step S402), the composition part analogy (step S403), the analogy result display (step S404), the makeup reference image display (step S405), the makeup reference image selection (step S406), and the makeup application to a taken image (step S407) of FIG. 9 are the same as the guide display (step S301), the imaging (step S302), the composition part analogy (step S303), the analogy result display (step S304), the makeup reference image display (step S305), the makeup reference image selection (step S306), and the makeup application to a taken image (step S307) of FIG. 6.

In FIG. 9, the makeup adviser's advice process is performed (step S408) instead of or after the advice process of FIG. 6. The makeup adviser's advice process may be performed in real time through screen sharing or may be performed by email, etc. These cases will be explained below.

Advice Process in Real Time

Figure 10:
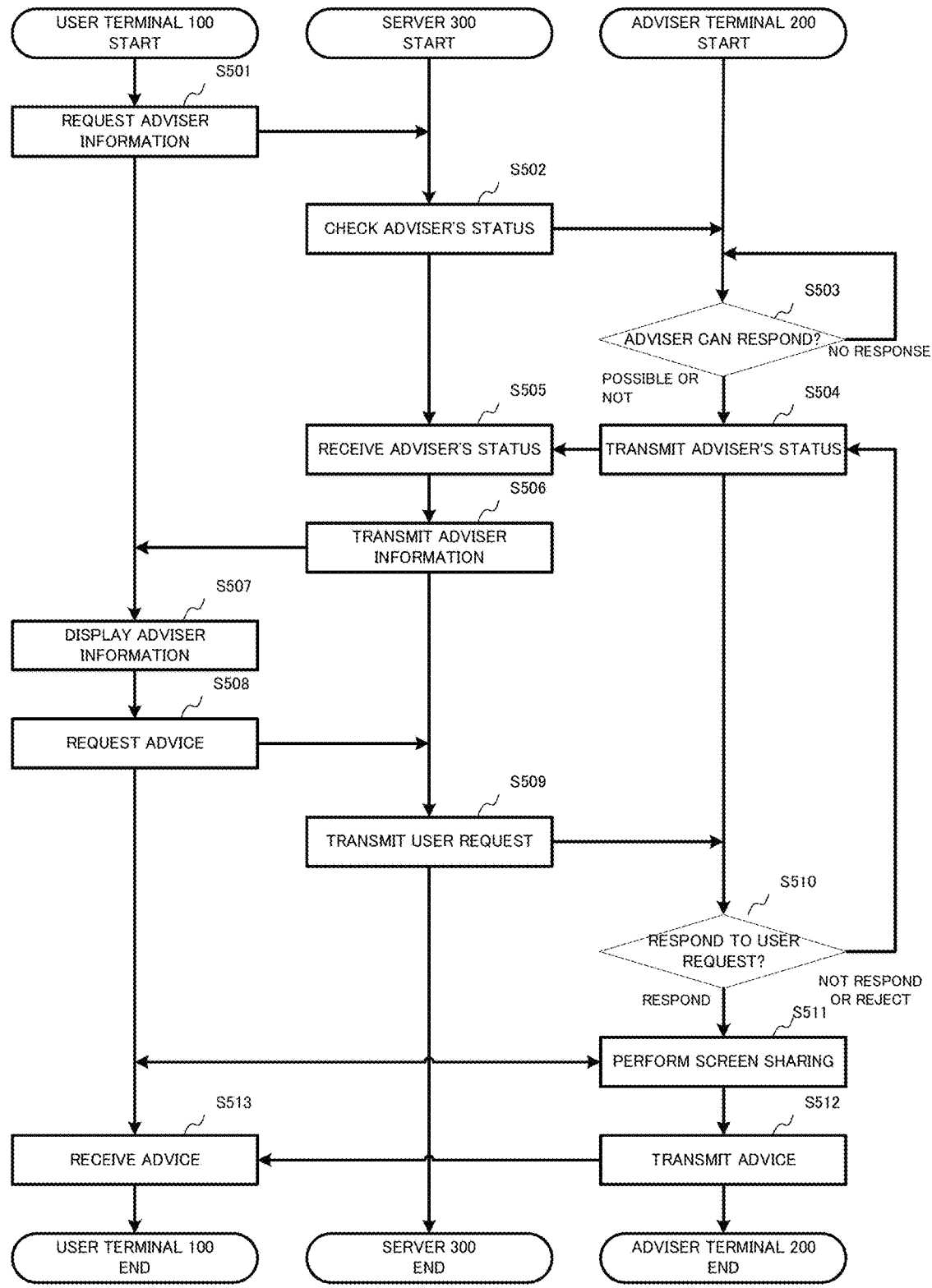
FIG. 10 shows a flow chart of the makeup adviser's advice process performed in real time through screen sharing.

FIG. 10 shows a flow chart of the makeup adviser's advice process of the step S408 performed in real time through screen sharing.

First, the user terminal 100 requests adviser information from the server 300 to receive an advice from an adviser (step S501). This is to acquire adviser information if two or more advisers exist.

The server 300 checks the status of advisers registered in the adviser information data base 332 by using the adviser's status check module 311 in response to the request (step S502). The status of all the advisers registered in the adviser information data base 332 may be checked. Alternatively, a weekday and a time at which an adviser can respond may be previously registered in the adviser information data base. The status of an adviser who can respond at that time may be checked.

The adviser terminal 200 that has received the check from the server 300 judges whether or not the makeup adviser can respond (step S503). This judgment may be performed based on some response that the makeup adviser inputs to a question from the adviser terminal 200 or based on the adviser's logged-in status in which off-line, away from computer, busy, offline, etc., is previously set in the same way as application software offering a chat service, etc.

As a result of the judgement, if the adviser can or cannot surely make a response, the adviser terminal 200 transmits the adviser's status to the server 300 (step S504). However, if the adviser's status is uncertain because for example, the makeup adviser does not input any response to the question from the adviser terminal 200, the status is checked at a regular interval until a response is received.

The server 300 receives the adviser's status from the adviser terminal 200 (step S505).

The adviser information transmitting module 312 generates adviser information based on the received data and data in the adviser information data base 332 and transmits the generated adviser information to the user terminal 100 (step S506). The adviser information includes the name, profile, face photo, and online or off-line status of the adviser, makeup reference images that the adviser worked on, which are necessary for the user to select an adviser from the user terminal 100. Moreover, the number of times that the user of the user terminal 100 received an advice from each adviser in the past may be added to the adviser information by looking up the user information data base 331, etc.

The user terminal 100 displays adviser information on the output unit 130 based on the received adviser information (step S507).

Figure 17:
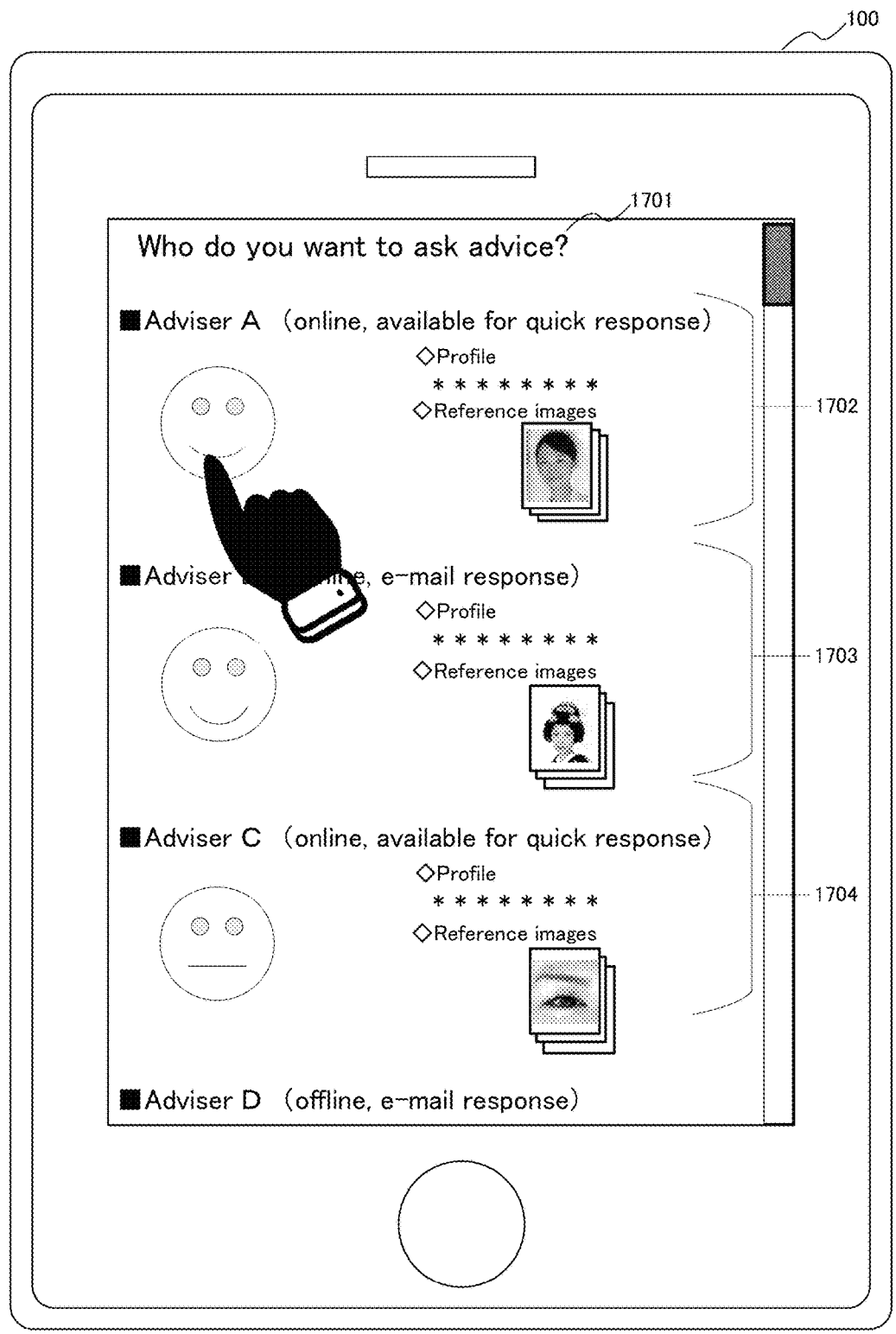
FIG. 17 shows one example of the adviser information displayed on the user terminal 100.

FIG. 17 shows one example of the adviser information displayed on the user terminal 100. In this example, the name, profile, face photo, and online or offline status of the adviser, makeup reference images that the adviser worked on are displayed. The order of displaying advisers can be appropriately set by the system and the user by putting a priority on the adviser who worked on the makeup reference image selected this time, the adviser in the online status, the popularity ranking, the number of times that the user received an advice in the past, etc. In FIG. 17, the message 1701 questions which makeup adviser the user asks for advice. The user selects a makeup adviser in reference to the profile 1702 of the adviser A, the profile 1703 of the adviser B, the profile 1704 of the adviser C, etc., and transmits an advice request to the server 300 (step S508). In this example, the user selects the adviser A.

The server 300 receives this advice request and transmits an user request to the adviser terminal 200 of the adviser A by using the user request transmitting module 313 (step S509). The request data from a user includes a real-time advice request through screen sharing and information on the makeup reference image selected this time. Moreover, the name, the gender, the age, the favorite makeup reference images, etc. of the user may be previously registered in the user information data base 331 and may be transmitted together with an advice request.

The adviser terminal 200 checks whether or not to respond to the real-time advice request from the user (step S510).

If responding to the user request, the adviser terminal 200 establishes communication with the user terminal 100 and performs screen sharing (step S511). The method of establishing the communication may be used for communication in a typical public or private line network or for direct peer to peer communication.

If not responding to the user request within a certain time or if rejecting the user request, the adviser terminal 200 returns the process to the adviser situation transmitting of the step S504 and notifies the user terminal 100 that the selected adviser cannot respond to the real-time advice request, through the server 300. The server 300 updates and transmits adviser information to the user terminal 100 to allow the user to select an adviser again.

Figure 18:
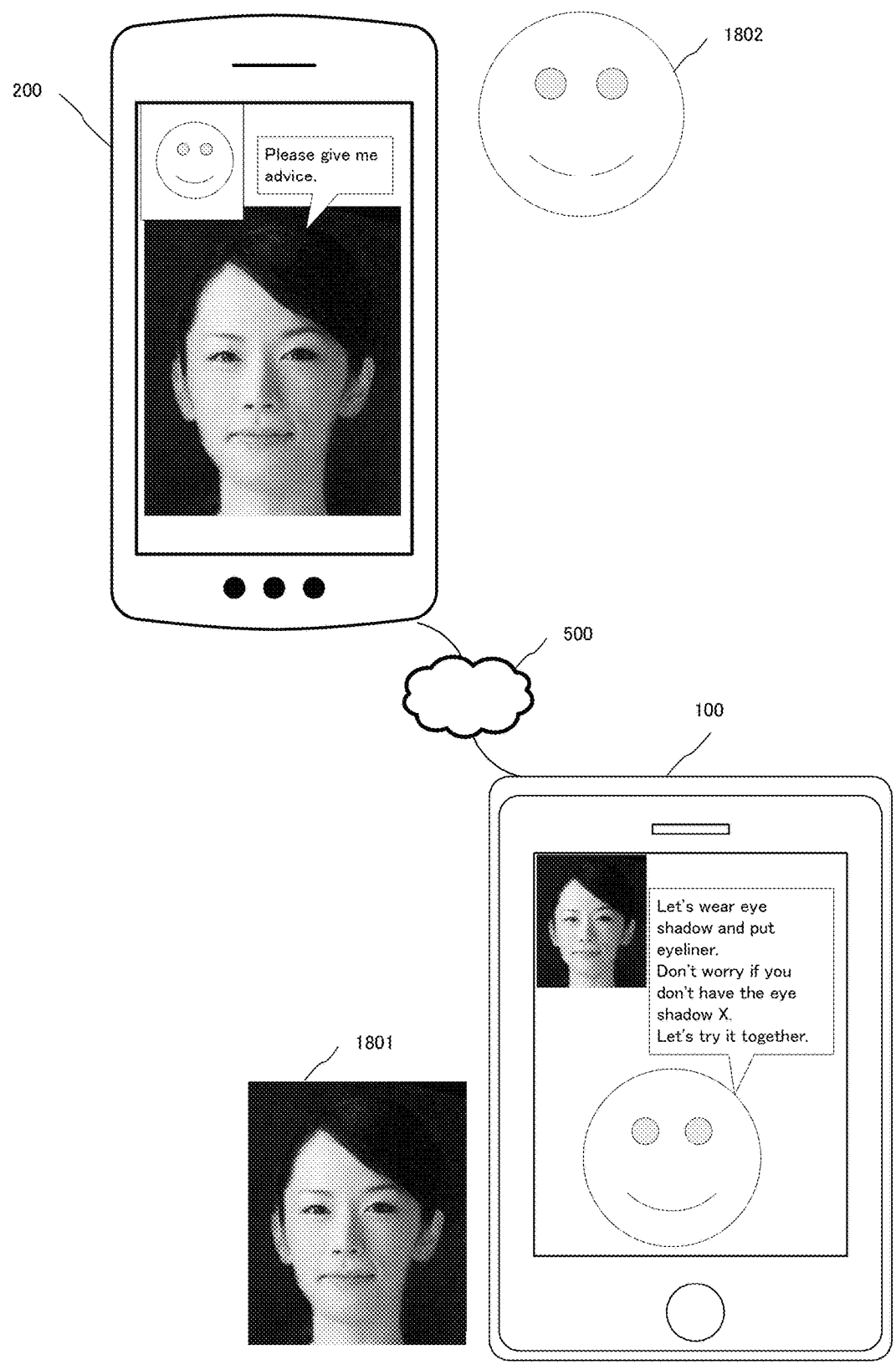
FIG. 18 shows one example display during screen sharing between the user terminal 100 and the adviser terminal 200.

FIG. 18 shows one example display during screen sharing between the user terminal 100 and the adviser terminal 200. The adviser who uses the adviser terminal 200 represents "1802," and the user who uses the user terminal 100 represents "1801." The user terminal image display module 231 displays some or all the images being output to the output unit 130 of the user terminal 100 on the output unit 230 of the adviser terminal 200. The adviser terminal 200 takes an advice image by using the advice image imaging module 211 of the adviser terminal 200 and transmits an advice by using the advice transmitting module 261 (step S512). The advice includes methods of selecting and using cosmetics and a specific makeup procedure based on the image that the user 1801 took and the makeup reference image that the user 1801 selected. The advice includes a still image, a moving image, a voice, and a reference URL as data.

The user terminal 100 receives the advice (step S513) and outputs the advice to the output unit 130 by using the advice module 134.

The image taken by the imaging module 111 and the image taken by the advice image imaging module 211 are output on the user terminal 100 and the adviser terminal 200 together with voices during screen sharing. This enables the user 1801 to put on makeup according to the received advice. The screen sharing is ended from any one of the user terminal 100, the adviser terminal 200, and the server 300. The one which ends screen sharing only has to notify the other two. The screen sharing method is not limited to the scope of the present invention. Any existing technologies are applicable.

Advice Process by E-Mail, Etc.

Figure 11:
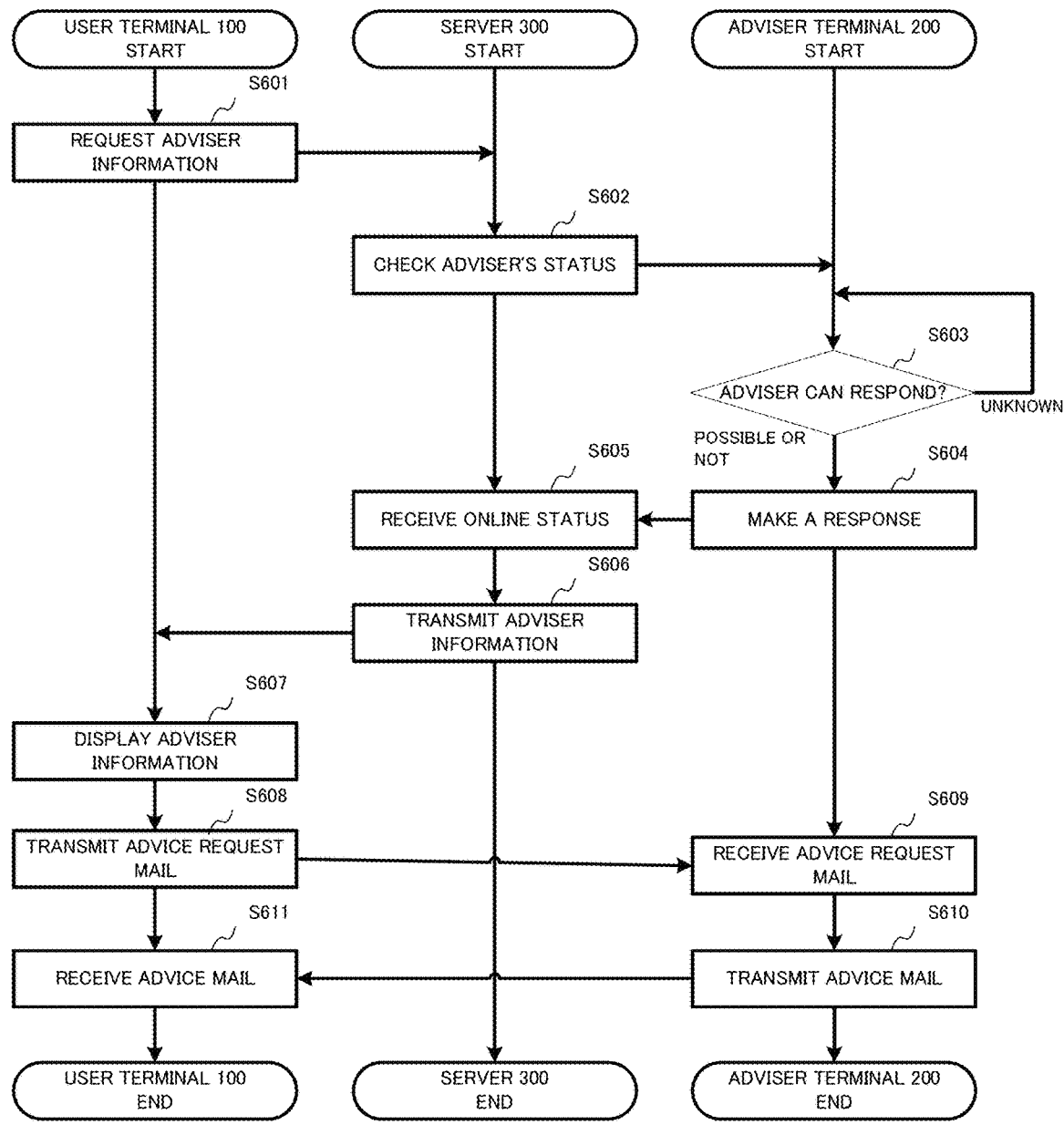
FIG. 11 shows a flow chart of the makeup adviser's advice process performed by email, etc.

FIG. 11 shows a flow chart of the makeup adviser's advice process of the step S408 performed by E-mail, etc.

The process from the step S601 to S607 in FIG. 11 is the same as that from the step S501 to S507 in FIG. 10.

Figure 19:
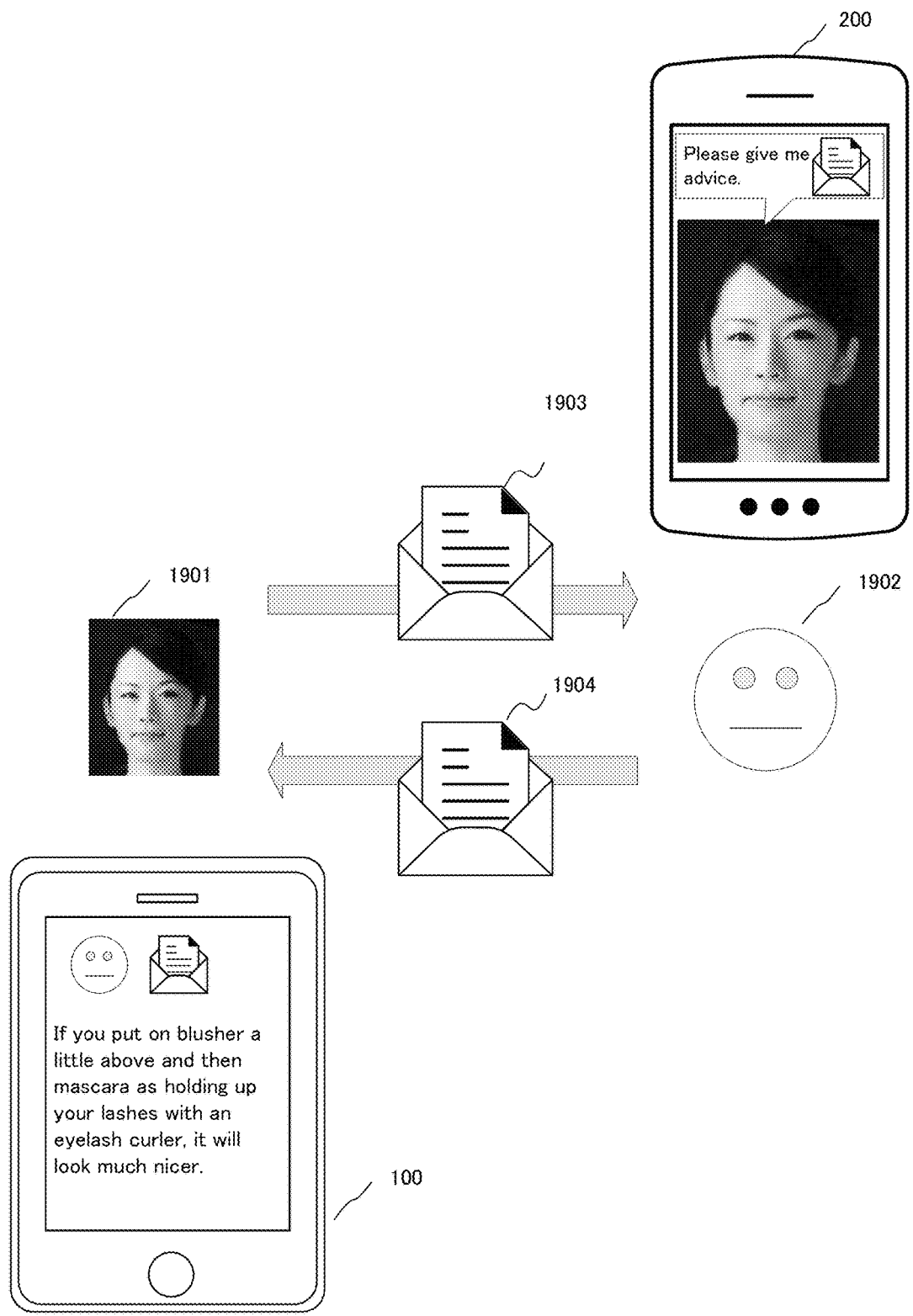
FIG. 19 shows a schematic diagram of the makeup adviser's advice process performed by email, etc., between the user terminal 100 and the adviser terminal 200.

FIG. 19 shows a schematic diagram of the makeup adviser's advice process performed by email, etc., between the user terminal 100 and the adviser terminal 200. The user who uses the user terminal 100 represents "1901," and the adviser who uses the adviser terminal 200 represents "1902."

If the user 1901 selects the offline adviser based on adviser information or selecting not a real time advice through screen sharing but an advice by E-mail, etc., the user terminal 100 transmits advice request mail 1903 (step S608). The advice request mail 1903 may contain the stored still images and moving images, input character strings, voice messages, etc. The advice by E-mail is held up as an example of the advice not through screen sharing. However, the advice does not have to be offered by E-mail. The other communication services such as SMS, a chat service, and SNS are applicable in the same way as E-mail.

The adviser terminal 200 receives the advice request mail 1903 from the user (step S609) and outputs the request to the output unit 230.

The adviser terminal 200 takes an advice image in response to the request mail by using the advice image imaging module 211 or input an advice message, etc., by using the input unit 220. The adviser terminal 200 attaches still images, moving images, input character strings, voice messages, etc. to advice mail 1904 to transmit (step S610).

The user terminal 100 receives the advice mail 1904 (step S611) and outputs the advice mail 1904 to the output unit 130 by using the advice module 134.

The advice request mail and the advice mail can be exchanged two or more times as required between the user terminal 100 and the adviser terminal 200.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), DVD (e.g., DVD-ROM, DVD-RAM), or a compact memory. In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

100 User terminal
200 Adviser terminal
300 Server
500 Communication network

What is claimed is:
1. A system for image processing, comprising:
a guide display unit that displays a guide to image a plurality of composition parts composing a person's face, the guide including a plurality of guide lines that correspond to the plurality of composition parts, respectively;

an imaging unit that images the face after the plurality of composition parts are fitted to the plurality of guide lines;

an analogy unit that analogizes the composition parts from the image of the face based on the guide lines;

a makeup reference image display unit that displays a list of makeup reference images for each analogized composition part; and a makeup reference image application unit that selects a makeup reference image from among the list of makeup reference images for each analogized composition part and applies the selected makeup reference image to a corresponding composition part in the image of the face.

2. The system according to claim 1, wherein the guide display unit indicates any one of a size, a direction, or a position of the face by the guide lines.

3. The system according to claim 1, wherein the analogy unit analogizes a type of each of the composition parts by image recognition of the image of the face and adds text information to the analogized composition parts.

4. The system according to claim 1, wherein the analogy unit displays that the face is successfully imaged when analogizing one or more of the composition parts.

5. The system according to claim 1, further comprising an advice unit that offers advice about how to put on makeup of the selected makeup reference image.

6. The system according to claim 5, wherein the advice unit offers advice in real time through screen sharing between the object and a makeup adviser.

7. A method for image processing, comprising:

displaying a guide to image a plurality of composition parts composing a person's face, the guide including a plurality of guide lines that correspond to the plurality of composition parts, respectively;

imaging the face after the plurality of composition parts are fitted to the plurality of guide lines;

analogizing the composition parts from the image of the face based on the guide lines;

displaying a list of makeup reference images for each of the analogized composition parts; and selecting a makeup reference image from among the list of makeup reference image for each analogized composition part and applying the selected makeup reference image to a corresponding composition part in the image of the face.

8. The method according to claim 7, wherein the guide indicates any one of a size, a direction, or a position of the face by the guide lines.

9. The method according to claim 7, wherein analogizing the composition parts comprises analogizing a type of each of the composition parts by image recognition of the image of the face and adds text information to the analogized composition parts.

10. The method according to claim 7, further comprising displaying that the face is successfully imaged when analogizing one or more of the composition parts.

11. The method according to claim 7, further comprising offering advice about how to put on makeup of the selected makeup reference image.

12. The method according to claim 11, wherein offering the advice comprises offering the advice in real time through screen sharing between the object and a makeup adviser.

* * * * *